United States Patent

[11] 3,612,426

| [72] | Inventor | John Germock, Jr.<br>20270 Lake Shore Blvd., Euclid, Ohio 44123 |
|---|---|---|
| [21] | Appl. No. | 45,320 |
| [22] | Filed | June 11, 1970 |
| [45] | Patented | Oct. 12, 1971 |

[54] EXTENSION CORD CADDY
2 Claims, 5 Drawing Figs.

[52] U.S. Cl. .................................................. 242/85.1, 248/309, 248/360
[51] Int. Cl. ...................................................... B65h 75/36
[50] Field of Search........................................... 248/309, 300, 89, 75, 76, 359, 360; 242/85.1, 96; 43/25.2

[56] References Cited
UNITED STATES PATENTS
| 632,234 | 9/1899 | Burgess .................... | 211/32 UX |
| 870,033 | 11/1907 | Hildreth ..................... | 43/25.2 |
| 1,365,762 | 1/1921 | Zinow ......................... | 242/85.1 |
| 2,833,075 | 5/1958 | Herron ........................ | 242/85.1 X |
| 3,133,683 | 5/1964 | Deacon ....................... | 242/85.1 X |

FOREIGN PATENTS
| 19,256 | 1905 | Great Britain............... | 248/89 |

*Primary Examiner*—J. Franklin Foss
*Attorney*—Bosworth, Sessions, Herrstrom & Cain ABSTRACT: A holder for storing a length of electric cord. Clips on the holder allow it to be attached to and remain with the electric cord when the cord is in use. The holder has a coiling form pivotable to one position for coiling an electric cord thereon and pivotable to another position to be out of the way when the cord is in use with the holder attached thereto. The holder need never be separated from the cord and is always available for storing the cord.

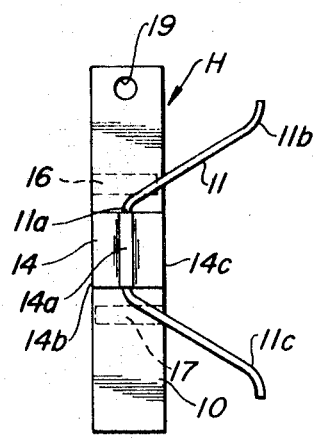
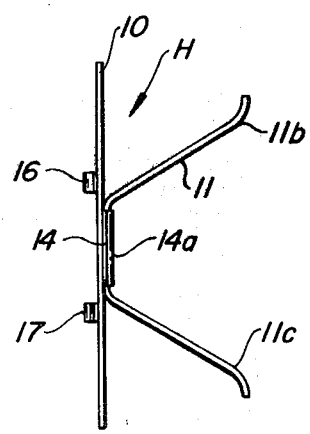
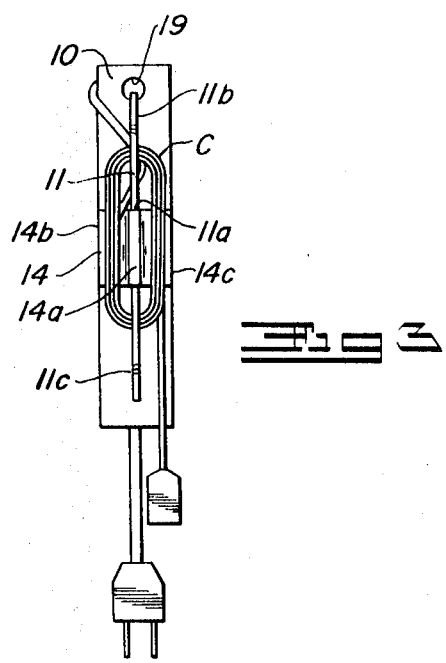
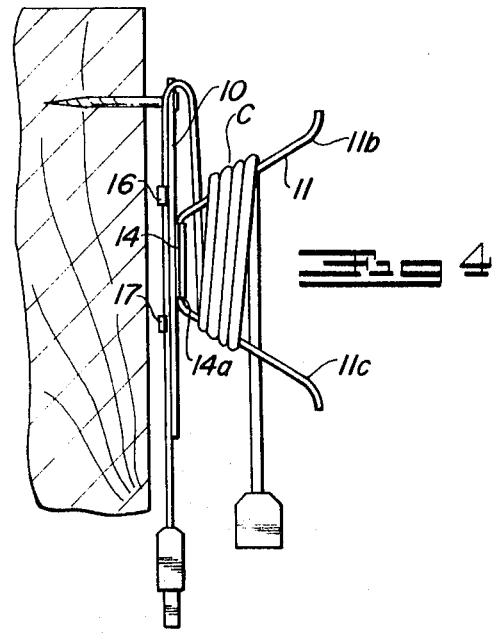
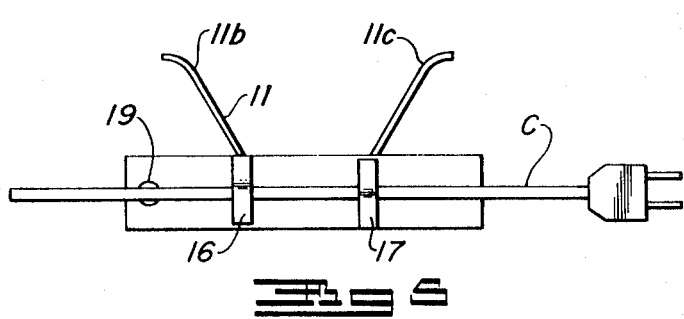

EXTENSION CORD CADDY

BACKGROUND OF THE INVENTION

This invention relates to storage means for electric cords such as extension cords and more particularly to holders for storing such cords in a coiled condition.

Electric cords, such as extension cords and the like, are conveniently stored in a coiled condition. Various forms of holders have been proposed on which electric cords can be coiled for storage. In many cases it is desirable to carry an extension cord or the like from place to place while it is on the holder. The cord is thereby maintained in a neat, coiled position while being transported.

When the cord is put to use it is usually uncoiled and separated from the holder and the holder is laid aside to await to return of the coil. With the holder and cord separated it all too often happens that the holder is misplaced and must be found before the cord can again be stored thereon.

SUMMARY OF THE INVENTION

A general object of my invention is to provide an extension cord holder that overcomes the disadvantages noted above encountered in using prior extension cord holders.

A more particular object of the invention is to provide a cord holder that can be attached to an extension cord when the cord is in use.

Another object is to provide such a cord holder having a coiling from that is pivotable to one position for coiling the cord thereon and to another position to provide minimum interference when the cord is in use with the holder attached thereto.

Still another object is to provide a holder for electric cords that is simple and inexpensive to manufacture and convenient to use.

In a preferred form my holder comprises a baseplate and a coiling form having a base portion and arms extending at angles from the base portion. The base portion of the coiling form is secured to the baseplate to allow pivotal movement of the form with respect to the baseplate. Means are provided on the baseplate for clipping an electric cord thereto.

For storing an electric cord on the holder the coiling form is positioned so that the cord can be coiled on the arms. When the cord is in use with the holder connected thereto, the form is positioned so as to present minimum interference to movement of the cord and holder.

BRIEF DESCRIPTION OF THE DRAWINGS

FIG. 1 is a front view of my electric cord holder showing the coiling form pivoted to its out-of-the-way position.

FIG. 2 is a side view of the cord holder showing the coiling form pivoted to its cord storing position.

FIG. 3 is a front view of the cord holder with an extension cord coiled on the coiling form.

FIG. 4 is a side view of the cord holder showing an electric cord passed through the cord clips and coiled upon the coiling form.

FIG. 5 is a rear view of the cord holder attached to an electric cord in use, the coiling form being pivoted to its out-of-the-way position.

DESCRIPTION OF THE PREFERRED EMBODIMENTS

Referring now to the drawings and initially to FIGS. 1 and 2, my extension cord holder, generally designated H, includes a baseplate 10 and a coiling form 11. Coiling form 11 is preferably made form a thin cylindrical rod and has a straight base portion 11a at its center. The rod is bent outwardly form each end of the base portion to form two oppositely extending arms 11b and 11c. A clamping member 14 having a central lengthwise channel or groove 14a clamps coiling form 11 to baseplate 10. Clamping member 14 may be attached at each of its ends 14b, 14c to baseplate 10 by welding, gluing or in any suitable manner depending upon the material from which the holder is made which may be metal, plastic or any suitable material.

Groove 14a faces inwardly toward the front face of baseplate 10 and is made just slightly larger than the diameter of base portion 11a of coiling form 11. Base portion 11a is adapted to fit within the groove and is free to rotate therein. Accordingly, coiling form 11 may be pivoted with respect to baseplate 10 from the position shown in FIG. 1 through 180° to the position where it again lies flat against baseplate 10 but with arms 11b and 11c extending outwardly from the left (as viewed in FIG. 1) side of baseplate 10.

As shown in FIG. 2 baseplate 10 is provided on its rear face with a pair of clips 16, 17. Each clip is secured at one of its ends to baseplate 10 by welding, gluing or in any other suitable manner and is open at its opposite end to receive and clamp an electric cord to baseplate 10. Baseplate 10 is also provided at its upper (as shown in FIG. 1) end with a hole 19 by which the cord holder may be hung on the nail or other support on a wall.

The pivotal position of coiling form 11 that will be normally used is that shown in FIG. 2 with the form lying in a plane substantially at right angles to baseplate 10. In this position an electric cord may be coiled about coiling form arms 11b and 11c for storage on the cord holder. Other positions of coiling form 11 that will have extensive use are the position shown in FIG. 1 and the position where the coiling form is pivoted 180° from the position shown in FIG. 1. Either of these latter two positions may be used when the electric cord itself is in use with the cord holder attached thereto. In either of the positions just described coiling form 11 will lie flat against baseplate 10 to minimize the resistance of the holder to sliding along a floor or other surface with the electric cord, and also minimize any tendency of the holder to catch on objects such as chair legs and the like.

FIGS. 3 and 4 are front and side views, respectively, of may electric cord holder storing an extension cord attached thereto. Conveniently, the extension cord, generally designated C, may, adjacent one end, be passed under clips 16 and 17 to be clamped to baseplate 10 and then coiled about coiling form arms 11b and 11c when the coiling form is in the pivotal position shown in FIG. 2. The cord holder with stored cord thereon may then be hung on the wall by placing hole 19 over a nail as shown in FIG. 4. The extension cord is thus stored conveniently and accessibly.

When it is desired to use the extension cord the entire cord holder may be removed from its resting place and conveniently transported to the location where the extension cord will be used with, for example, a handtool such as a drill or an appliance such as a vacuum sweeper. In either case, the extension cord may be uncoiled from the cord holder and coiling form 11 pivoted to lie flat against baseplate 10. The extension cord can be mated in the normal manner with another electrical cord or with an electrical outlet without detaching the cord holder, as shown in FIG. 5.

During use of the extension cord it may be dragged form place to place across a floor or other surface as, for example, when it is used with a vacuum sweeper. During such use the cord holder will remain attached to the extension cord as shown in FIG. 5 and will lie flat on the floor with no large vertical projections to offer resistance to sliding motion and to catch on objects such as chair legs and the like.

When the cleaning or other operation is completed the extension cord will be disconnected from its mating electrical connections. After coiling form 11 is pivoted back to its cord storing position the cord may be coiled on the form as described above. The cord holder with cord stored thereon may then be transported to another place of use or returned to its spot on the wall. For the entire period of use the cord holder and the extension cord were never separated so that the cord holder could not have been misplaced while the extension cord was in use.

While I have described a preferred form and embodiment of my invention changes and improvements will occur to those skilled in the art who come to understand its essential principles and accomplishments. I do not, therefore, wish to be confined to the specific form of my invention herein specifically disclosed nor in any way inconsistent with the progress by which my invention has promoted the art.

What is claimed is:

1. A holder for use with a length of electric cord comprising a baseplate, a substantially flat coiling form having a base portion and having arms extending at angles from the base portion, means pivotally securing said base portion to said baseplate and enabling said coiling form to be pivoted to a position in which it lies substantially flat against said baseplate and means on said baseplate for attaching an electric cord thereto.

2. The holder as claimed in claim 1 wherein said baseplate has a front face and a rear face, said coiling form being secured to said front face and said cord clamping means being on said rear face.